United States Patent
Snowdon et al.

(10) Patent No.: US 10,623,335 B2
(45) Date of Patent: Apr. 14, 2020

(54) NETWORK DEVICE AND A METHOD FOR NETWORKING

(71) Applicant: METAMAKO HOLDING PTY LTD, Sydney NSW (AU)

(72) Inventors: David Charles Ambler Snowdon, Darlinghurst (AU); Charles Nicholas Alexander Thomas, Pennant Hills (AU); Scott McDaid, Bilgola Plateau (AU)

(73) Assignee: METAMAKO HOLDING PTY LTD, Sydney (AU)

( * ) Notice: Subject to any disclaimer, the term of this patent is extended or adjusted under 35 U.S.C. 154(b) by 0 days.

(21) Appl. No.: 15/723,879

(22) Filed: Oct. 3, 2017

(65) Prior Publication Data
US 2018/0026915 A1    Jan. 25, 2018

Related U.S. Application Data

(63) Continuation of application No. 14/385,121, filed as application No. PCT/AU2012/000410 on Apr. 19, 2012, now Pat. No. 9,819,611.

(30) Foreign Application Priority Data

Mar. 12, 2012  (AU) ................. 2012900975

(51) Int. Cl.
*H04L 12/933*  (2013.01)
*H04L 12/931*  (2013.01)
*H04L 12/937*  (2013.01)
*H04L 12/935*  (2013.01)

(52) U.S. Cl.
CPC .............. *H04L 49/10* (2013.01); *H04L 49/00* (2013.01); *H04L 49/254* (2013.01); *H04L 49/30* (2013.01)

(58) Field of Classification Search
CPC ....... H04L 49/10; H04L 49/254; H04L 49/30; H04L 49/00
See application file for complete search history.

(56) References Cited

U.S. PATENT DOCUMENTS

| | | | |
|---|---|---|---|
| 5,841,775 A * | 11/1998 | Huang | H04L 45/00 370/422 |
| 6,094,436 A | 7/2000 | Runaldue et al. | |
| 6,175,571 B1 * | 1/2001 | Haddock | H04L 12/5601 370/423 |
| 6,222,825 B1 | 4/2001 | Mangin et al. | |
| 6,233,242 B1 | 5/2001 | Mayer et al. | |
| 7,042,901 B1 * | 5/2006 | Hann | H04L 12/2854 370/395.1 |

(Continued)

OTHER PUBLICATIONS 10-630A/631A: 16/32/64 Channel Multiplexer Module. URL: http://www.pickeringtest.com/pdf/10-630AD.pdf> Issue 4.0, published Feb. 2012 (4 pages).

*Primary Examiner* — Hashim S Bhatti
(74) *Attorney, Agent, or Firm* — Chamberlain, Hrdlicka, White, Williams & Aughtry

(57) ABSTRACT

A networking device including a plurality of client ports arranged for communicating with a plurality of clients, a service port arranged for communicating with a machine arranged to communicate with the plurality of clients, and networking componentry arranged to communicate electromagnetic communications between the plurality of client ports and the service port.

18 Claims, 4 Drawing Sheets

(56) References Cited

U.S. PATENT DOCUMENTS

| | | | |
|---|---|---|---|
| 7,439,763 B1 | 10/2008 | Kavipurapu et al. | |
| 7,480,246 B2 | 1/2009 | Agarwal et al. | |
| 7,584,262 B1* | 9/2009 | Wang | H04L 12/4625 |
| | | | 709/217 |
| 7,586,909 B1 | 9/2009 | Walrand et al. | |
| 7,623,453 B2 | 11/2009 | Lee et al. | |
| 7,671,624 B1 | 3/2010 | Walstrum, Jr. | |
| 7,907,630 B1 | 3/2011 | Bicknell | |
| 8,014,288 B1* | 9/2011 | MacAdam | H04L 47/10 |
| | | | 370/235 |
| 8,868,923 B1 | 10/2014 | Hamlet et al. | |
| 8,976,667 B1* | 3/2015 | Dropps | H04L 47/30 |
| | | | 370/235 |
| 9,018,972 B1 | 4/2015 | Gurrieri et al. | |
| 2002/0136163 A1* | 9/2002 | Kawakami | H04L 47/10 |
| | | | 370/229 |
| 2002/0191592 A1 | 12/2002 | Rogers et al. | |
| 2003/0152067 A1* | 8/2003 | Richmond | H04L 63/0218 |
| | | | 370/352 |
| 2003/0200330 A1 | 10/2003 | Oelke et al. | |
| 2004/0170173 A1* | 9/2004 | Pan | H04J 3/1617 |
| | | | 370/392 |
| 2005/0111843 A1* | 5/2005 | Takeuchi | H04B 10/077 |
| | | | 398/38 |
| 2005/0141567 A1* | 6/2005 | Jaber | H04J 3/1617 |
| | | | 370/537 |
| 2006/0133274 A1* | 6/2006 | Lee, II | H04L 12/18 |
| | | | 370/230 |
| 2006/0155853 A1* | 7/2006 | Nesz | H04L 61/2015 |
| | | | 709/227 |
| 2006/0187913 A1* | 8/2006 | LaVigne | H04L 12/56 |
| | | | 370/389 |
| 2007/0189283 A1 | 8/2007 | Agarwal et al. | |
| 2007/0297393 A1 | 12/2007 | Furukawa et al. | |
| 2008/0080391 A1 | 4/2008 | Hu et al. | |
| 2008/0212579 A1* | 9/2008 | LaVigne | H04L 12/4633 |
| | | | 370/389 |
| 2009/0232151 A1 | 9/2009 | Furlong et al. | |
| 2009/0310616 A1 | 12/2009 | Cummings et al. | |
| 2010/0265824 A1 | 10/2010 | Chao et al. | |
| 2010/0332664 A1* | 12/2010 | Yevmenkin | H04L 29/12405 |
| | | | 709/227 |
| 2011/0025435 A1 | 2/2011 | Gorbachov | |
| 2013/0016609 A1* | 1/2013 | Hayakawa | H04L 69/14 |
| | | | 370/230 |

* cited by examiner

NETWORK DEVICE AND A METHOD FOR NETWORKING

RELATED APPLICATIONS

The present application is continuation of U.S. patent application Ser. No. 14/385,121, filed Sep. 12, 2014, which is a National Phase entry of PCT Application No. PCT/AU2012/000410, filed Apr. 19, 2012, which claims priority from Australian Patent Application No. 2012900975, filed Mar. 12, 2012, the disclosures of which are hereby incorporated by reference herein in their entirety.

TECHNICAL FIELD

The disclosure herein generally relates to a network device and a method for networking, and particularly but not exclusively to low latency communication between a plurality of client ports and a service port of the network device.

BACKGROUND

The latency of a communication sent between one of the plurality of clients and a server may be, in some circumstances, an important factor in securing a favorable outcome. For example, being the first to have a complete electronic trade order received by a stock exchange may establish trade priority. Advantage can then be taken of favorable prices for financial instruments, examples of which include but are not limited to shares, derivatives and futures. Being the first to receive market information may enable a trader to take advantage of favorable market conditions before others. In another example, a favorable outcome for an individual playing a networked electronic game may be determinant on the latency of a gaming command received by a gaming system. Being able to send a low latency instruction to place a wager or a bid at an auction, for example, may increase the probability of securing good odds, a good price, or a successful purchase. Furthermore, it may be desirable, in at least some circumstances, to keep communications confidential.

SUMMARY

Disclosed herein is a network device. The network device comprises a plurality of client ports arranged for communicating with a plurality of clients. The network device comprises a service port arranged for communicating with a machine arranged to communicate with the plurality of clients. The network device comprises networking componentry arranged to communicate electromagnetic communications between the plurality of client ports and the service port.

In an embodiment, the networking componentry comprises a unidirectional network arranged to unidirectionally communicate an electromagnetic communication received by any one of the plurality of client ports to the service port. The unidirectional network may comprise a plurality of client port receivers. Each of the plurality of client ports may have a respective one of the client port receivers. The unidirectional network may comprise a multiway switch arranged to control which one of the plurality of client port receivers is in communication with the service port. The multiway switch may comprise a 1-pole multiway (1×N) switch. The 1 pole of the multiway switch may be in communication with the service port. The service port may comprise a service port transmitter in communication with the 1-pole of the multiway switch. Each way of the multiway switch may be in communication with only one of the plurality of client port receivers at a time. The unidirectional network may comprise a plurality of client port buffers. Each of the plurality of client port buffers may be electromagnetically disposed between a respective one of the plurality of client port receivers and the multiway switch. Each of the client port buffers may be arranged to exclusively cooperate with the respective one of the plurality of client port receivers. Embodiments in which a respective one of the client port buffers is dedicated to each of the plurality of client port receivers may have less latency than embodiments in which the more than one client port receiver share a buffer. The networking componentry may comprise a scheduler arranged to control which way of the multiway switch is connected to the 1 pole. The scheduler may be in communication with the plurality of client ports. The scheduler may be a first-in-first-out scheduler.

In an embodiment, the networking componentry comprises another unidirectional network arranged to communicate another electromagnetic communication received by the service port to at least one of the plurality of client ports. The other electromagnetic information may comprise, for example, market information. The other unidirectional network may comprise a common bus. The common bus may be electromagnetically disposed between the plurality of client ports and the service port. The other unidirectional network may comprise a plurality of client port transmitters. Each of the plurality of client ports may have a respective one of the client port transmitters. The common bus may be arranged to broadcast the other electromagnetic communication from the service port at the plurality of client port transmitters. The other unidirectional network may comprise a service port buffer. The service port buffer may be electromagnetically disposed between a service port receiver and the common bus.

In an embodiment, the networking device comprises a communication control system arranged to send via one of the plurality of client ports a command to at least one of pause and stop transmission to the networking device. The communication control system may be arranged to send the command when the device is approaching capacity. The command may be sent to prevent information loss. The networking device may comprise another communication control system arranged to send via the service port another command to at least one of pause and stop transmission to the networking device. The other communication control system may be arranged to send the command when the device is approaching capacity. The command may be sent to prevent information loss.

Embodiments having a unidirectional network and another unidirectional network may provide an ingenuous approach to providing low latency communications. Complicated N×N switching may be not necessary, and power consumption and complexity may be reduced.

In an embodiment, the scheduler and the multiway switch are synchronized by a clock signal. Additionally, the plurality of client port transmitters may be synchronized by the clock signal. Additionally, the service port transmitter may be synchronized by the clock signal. Having the scheduler, service port transmitter, multiway switch and the plurality of client port transmitters, for example, synchronized may reduce or remove altogether the need for buffers (that may add latency) that would otherwise be needed if an electromagnetic communications received at a client port travelled from one part of the networking device to another having a different clock rate.

In an embodiment, the networking componentry is arranged to block electromagnetic communications between the plurality of client ports. The client port receiver of any one of the client ports may be electromagnetically isolated from the client port transmitter of any of the other client ports. Consequently, confidentiality of client communications may be achieved.

Generally, but not necessarily, the electromagnetic communication comprises a packet. Generally, but not necessarily, the other electromagnetic communication comprises another packet. The packet and the other packet may each comprise, for example, a header and a payload. At least one of the packet and the other packet may comprise and a trailer. The packet and the other packet may comprise, for example, an internet protocol (IP) packet. The internet protocol packet may have a TCP segment payload, for example.

In an embodiment, the networking componentry is arranged to associate filter information with each of the plurality of client ports. The networking componentry may be arranged to communicate the other electromagnetic communication received by the service port to those of the plurality of client ports that have associated filter information indicated by the electromagnetic message. The networking componentry may be arranged to extract filter information from the other electromagnetic message. The information may be extracted from at least one of a header (that is, "header information"), a payload ("payload information") and a trailer ("trailer information") of the other electromagnetic communication. The networking componentry may be arranged to compare the extracted filter information with the filter information associated with the ports. Each of the plurality of client ports may have associated filter information stored thereat. The filter information may comprise, for example, at least one of a MAC address, an Internet Protocol (IP) address, IP packet header and/or trailer information, Transmission Control Protocol (TCP) port identification information, and User Datagram Protocol (UDP) port identification information. Generally, any suitable filter information may be used.

In an embodiment, the networking componentry comprises a plurality of electromagnetic communication filters that each have associated filter information. Each of the plurality of client ports may be operatively coupled to at least one of the plurality of electromagnetic communication filters. Each of the plurality of electromagnetic communication filters may be at a respective one of the plurality of client ports. The plurality of electromagnetic communication filters may be arranged to communicate the other electromagnetic communication received by the service port to only those of the plurality of client ports that have associated filter information indicated by the other electromagnetic communication. The plurality of electromagnetic communication filters may each comprise at least one of a Media Access Control (MAC) filter, an Internet protocol (IP) filter, an IP port filter, a TCP port filter, a UDP port filer, a header information filter, a payload information filter and a trailer information filter. Generally, the electromagnetic filters may comprise any filter suitable for the type of filtering being performed.

In an embodiment, the networking componentry associates with at least some of the plurality of client ports filter information unique to each of the at least some of the plurality of client ports. That is, the filtering information may be associated for unicasting the other electromagnetic message received by the service port. The networking componentry may associate filter information with more than one of the plurality of client ports that is the same for each of the more than one of the plurality of client ports. That is, the filtering information may be associated for at least one of multicasting and broadcasting the other electromagnetic communication received by the service port.

In an embodiment, the networking componentry comprises electronics. The unidirectional network and the other unidirectional network may each comprise a respective electrical network. The networking componentry may comprise at least one logic device. The at least one logic device may comprise a programmable logic device. Examples of programmable logic devices include but are not limited to a field programmable gate array (FPGA) and a complex programmable logic device. Alternatively or additionally, the at least one logic device may comprise an application specific integrated circuit (ASIC). At least one of the unidirectional network and the other unidirectional network may at least in part be integral to the at least one logic device. The multiway switch may be integral to the at least one logic device. The plurality of client port buffers and the service port buffer may be integral to the at least one logic device. The plurality of electromagnetic message filters may be integral to the at least one logic device. The scheduler may be integral to the at least one logic device.

An embodiment may comprise electronics arranged for connecting with a wireless network.

In an embodiment, the networking componentry comprises optics. The filter information may comprise optical wavelength information. For example, at least some of the electromagnetic filters may be optical bandpass filters comprising Bragg fiber gratings and/or dielectric stack filters. The multiway switch may comprise an optical switch, such as a microelectromechanical system (MEMS) optical switch or an optoelectronic switch.

In an embodiment, the networking componentry comprises optoelectronics. For example, the network device may connect to an optical fiber. The receiver and the transmitter may be an optical receiver and an optical transmitter respectively. The plurality of client port receivers and the plurality of client port transmitters may comprise optical receivers and optical transmitters respectively.

Disclosed herein is a method for networking. The method comprises the step of communicating electromagnetic communications between a plurality of client ports arranged for communication with a plurality of clients and a service port arranged for communication with a machine arranged to communicate with the plurality of clients.

An embodiment of the method comprises the step of blocking electromagnetic communications between the plurality of client ports.

An embodiment of the method comprises the step of communicating an electromagnetic communication received by any one of the plurality of client ports via a unidirectional network to the service port. The method may comprise the step of controlling which one of the plurality of client ports is in communication with the service port. The method may comprise the step of scheduling the order in which the plurality of client ports are in communication with the service port. The scheduling may be first-in-first-out scheduling. The method may comprise the step of buffering the electromagnetic communication. The method may comprise the step of each of a plurality of client port buffers exclusively cooperating with the respective one of a plurality of client port receivers.

In an embodiment, the method may comprise the step of communicating another electromagnetic communication received by the service port to at least one of the plurality of client ports via another unidirectional network. The step of communicating the other electromagnetic communications via the other unidirectional network may comprise the step of broadcasting the other electromagnetic communication. The method may comprise buffering the other electromagnetic communication.

In an embodiment, the method comprises the step of synchronizing the step of controlling and the step of scheduling to a clock signal. Additionally, the method may comprise the step of synchronizing sending of the electromagnetic communication from the service port to the clock signal. Additionally, the method may comprise the step of synchronizing sending of the other electromagnetic communication from any one of the plurality of client ports to the clock signal.

In an embodiment, the method comprises the step of communicating the other electromagnetic communication received by the service port to those of the plurality of client ports that have associated filter information indicated by the electromagnetic message.

In an embodiment, the method may comprise the step of associating filter information with each of the plurality of client ports. The method may comprise the step of associating with each of the plurality of client ports information unique to each of the plurality of client ports. The method may comprise the step of associating identical filter information with more than one of the plurality of client ports. The method may comprise the step of extracting filter data indicative of filter information from the other electromagnetic communication. The method may comprise the step of comparing the filter data extracted from the other electromagnetic communication with filter information associated with the ports.

In an embodiment, the method comprises the step of sending via one of the plurality of client ports a command to at least one of pause and stop transmission. The command may be sent when a capacity is approached. The command may be sent to prevent information loss. Similarly, the method may comprise sending via the service port a command to at least one of pause and stop transmission.

Disclosed herein is processor readable tangible media including program instructions which when executed by a processor causes the processor to execute the method as disclosed above.

The tangible media may comprise, for example, a hard drive, FLASH memory, or any other suitable tangible media.

Disclosed herein is a program for instructing a processor, which when executed by the processor causes the processor to execute the method as disclosed above.

Any one or more features of the network device, the method for networking, the processor readable tangible media, and the program disclosed above may be combined with any one of more feature of the method disclosed above.

BRIEF DESCRIPTION OF THE FIGURES

Embodiments of a networking device and a method for networking will now be described by way of example only with reference to the accompanying figures, in which.

DESCRIPTION OF EMBODIMENTS

Figure 1:
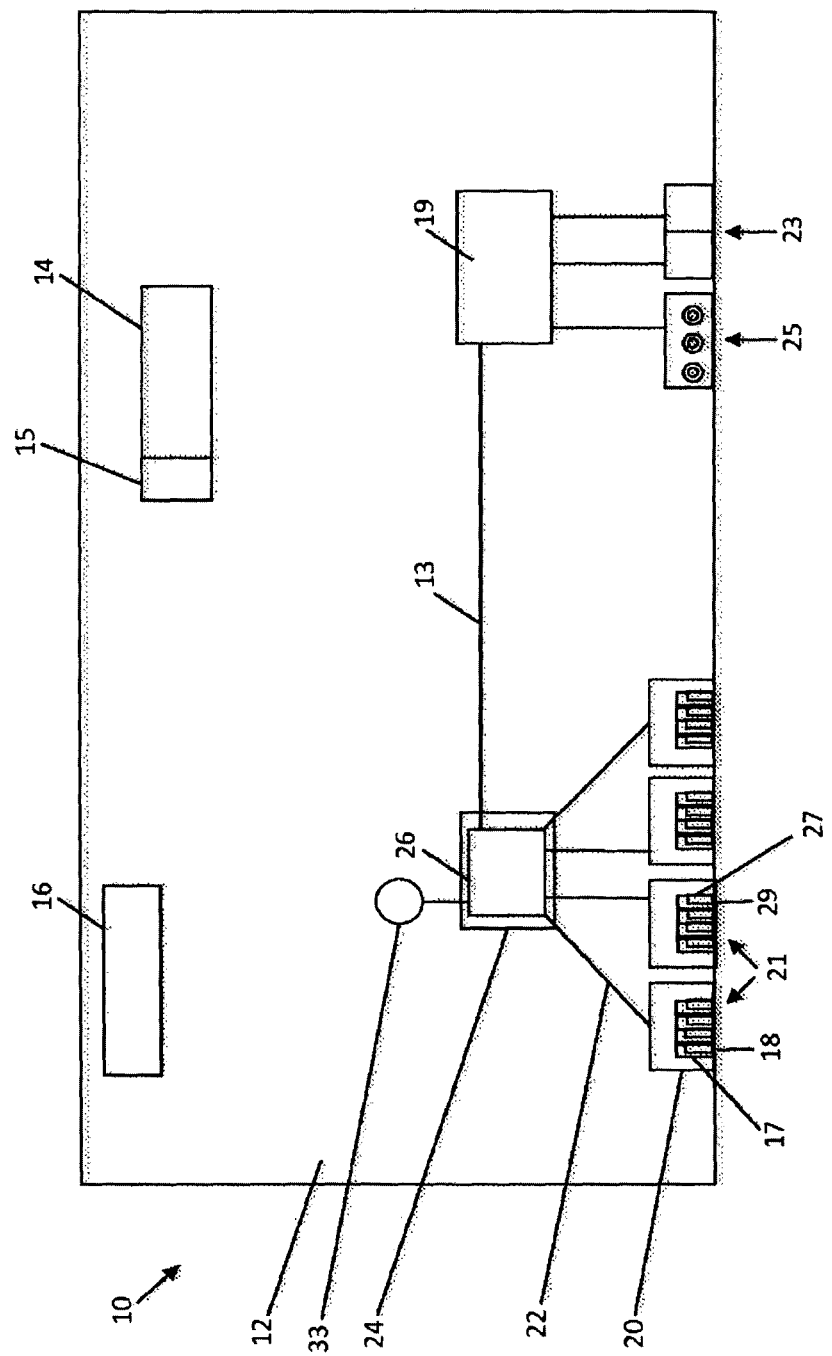
FIG. 1 shows a schematic plain view of one embodiment of a networking device.

FIG. 1 shows a schematic plain view of one embodiment of a networking device generally indicated by the numeral 10. The device 10 is arranged to communicate with a plurality of clients. The clients may be in the form of financial instrument transaction ordering computers, for example. The networking device 10 may also be arranged to communicate with a machine in the form of a server, for example. The server may be, for example, in a stock exchange and executes orders for the buying and selling of financial instruments originating from the clients.

This embodiment of the networking device 10 has a multilayer printed circuit board 12 having components mounted thereto which generally, but not necessarily, are connected to each other by conductive pathways, which may comprise, for example, tracks, signal traces, strip lines and/or micro strip lines, and wires, as appropriate. Generally, but not necessarily, the printed circuit board 12 is housed by a rack mountable enclosure having dimensions of 1 rack unit, although any suitable enclosure may be used or not used as desired. The printed circuit board has various surface mounted and/or through hole components mounted thereto.

A mains supply 14 may be mounted to the printed circuit board 12, the main supply in use producing a relatively low voltage, such as 12, 24 or 48 volts as suitable, from a relatively high voltage source, for example, a 110V or 240V electricity grid. There may be a DC regulator in the form of a switched mode power supply module 15 mounted to the printed circuit board 12 that receives the low voltage output from the mains supply 14 and powers two or more active conductive rails integral to the circuit board 12. Alternatively, the mains supply and DC regulator may be mounted within the enclosure separate from the printed circuit board 12.

At least one fan 16 may be mounted to the circuit board 12 or alternatively the enclosure. The at least one fan may provide airflow across the multilayer printed circuit board to extract waste heat.

The printed circuit board 12 may also have mounted thereto a management unit 19 comprising, in this but not necessarily all embodiments, an ARM processor communicating with serial or Ethernet interfaces 23 for receiving instructions via an Ethernet (or other) management network or other source, for example. The management unit 19 may also control active indicia 25 in the form of LED status lights mounted at the front of the enclosure.

The embodiment of the network device 10 of FIG. 1 has a plurality of ports, for example port 17 and 27. Each of the ports has a physical layer interface in the form of a transceiver, such as transceiver 18 of port 17. In this embodiment, but not necessarily in all embodiments, the plurality of transceivers comprise Small Form Factor Pluggable Plus (SFP+) transceivers. Other embodiments may use GBIC, XFP, XAUI transceivers, or generally any suitable transceivers. Alternative embodiments may use separate receivers and transmitters that are not integral to transceivers. The transceivers 18 are arranged to engage one or more received physical layer conduits in the form of external optical fiber network cables and/or copper network cables. The transceiver may send and receive electromagnetic communications in the form of at least one of an optical signal and an electrical signal. In this embodiment, the transceivers are each configured to receive two LC connectors terminating respective optical fiber cables that click into the transceiver, but any suitable connectors may be used. One of the optical fibers is for electromagnetic communications received by the transceiver, and communicates with a receiver 42 of the transceiver, and the other is for electromagnetic communications sent by the transceiver and is connected to a transmitter 44 of the transceiver. The transceivers generate electrical signals from the received optical signals, and subsequently communicate the electrical signals to the printed circuit board 12. The transceivers may support the gigabit Ethernet protocol and receive and/or transmit Ethernet packets, but other embodiments may have transceivers that support SONET, Fibre Channel, or any other suitable communications standard.

In the embodiment of FIG. 1, but not necessarily in all embodiments, one of the transceivers 29 in use receives a connector of an optical fiber network cable in communication with the machine arranged to communicate with the plurality of clients. The port associated with this transceiver 29 is the service port 27. Some of the remaining transceivers generally indicated by the numerals 17 and 21 (in some embodiments all of the remaining transceivers) in use receive respective ends of optical fiber cables in communication with at least a respective one of the plurality of clients. These ports are client ports. The port 17 is one of the client ports 21. In some embodiments more than one client is in communication with one of the client ports.

The transceivers may be housed in enclosures in the form of SFP cages 20 fixed to the printed circuit board 12. The cages provide an electrical connection between electrical contacts on the transceivers 18 and conductive tracks 22 in the form of stripline and/or micro strip line tracks formed on or within the circuit board 12. The cages may also act as Faraday cages to reduce electromagnetic interference, and extract heat from the transceiver. In alternative embodiments, the transceivers may be mounted directly to the printed circuit board.

The stripline 22 (which may be a micro-stripline, for example) provides a conduit for communications between the transceivers and networking componentry 24. The networking componentry is arranged to communicate electromagnetic communications between the plurality of client ports and the service port. In this embodiment the networking componentry 24 comprises a logic device 26 in the form of a field programmable gate array (FPGA). In other embodiments, the logic device may be any suitable logic device such as a complex programmable logic device, and an application-specific integrated circuit (ASIC). In some embodiments, the networking componentry may comprise more than one logic device.

The field programmable array 26 may have any suitable architecture. In one embodiment, the FPGA architecture comprises an array of configurable logic blocks, I/O heads or pins, and routing channels. Generally but not necessarily, the logic blocks comprises of logical cells that may comprise of, for example, a look up table, a full adder, and a D-type flip flop. Clock signals may be routed through special purpose dedicated clock networks within the FPGA in communication with a reference clock 33 mounted on the printed circuit board 12. The FPGA may also include higher-level functionality including embedded multipliers, generic digital signal processing blocks, embedded processors, high-speed I/O logic for communication with components external of the FPGA (for example), and embedded memories that may be used by buffers.

The reference clock 33 has a frequency of 156.25 MHz, but other frequencies may be used as appropriate.

The internal structure of the FPGA is configured to form a plurality of modules. The modules are initially specified, for example, using a hardware description language, examples of which include HDL, VHDL and VERILOG. The functionality to be implemented in the FPGA is described in a hardware description language. The description is compiled, synthesized and mapped to the FPGA using appropriate EDA tools to a configuration file that, when loaded or programmed into the FPGA, causes the FPGA to implement the functionality described.

Generally, but not necessarily, the electromagnetic communications processed by the networking device comprise packets. The packets generally, but not necessarily, comprise, for example, a header, and a payload. The packets may also have a trailer. The electromagnetic communications may be structured in accordance with the Open Systems Interconnection Model, in which each payload may be itself another packet of another layer of the OSI model. For example, at the physical layer the packet is a collection of bits. The physical layer packet may comprise a data link packet having a datalink header, a datalink payload and a datalink trailer. The datalink payload may in turn comprise a Network data packet such as an IP packet. The FP packet payload may comprise a TCP or UDP packet ("segment"). This layered structure may continue to the Application layer.

Figure 2:
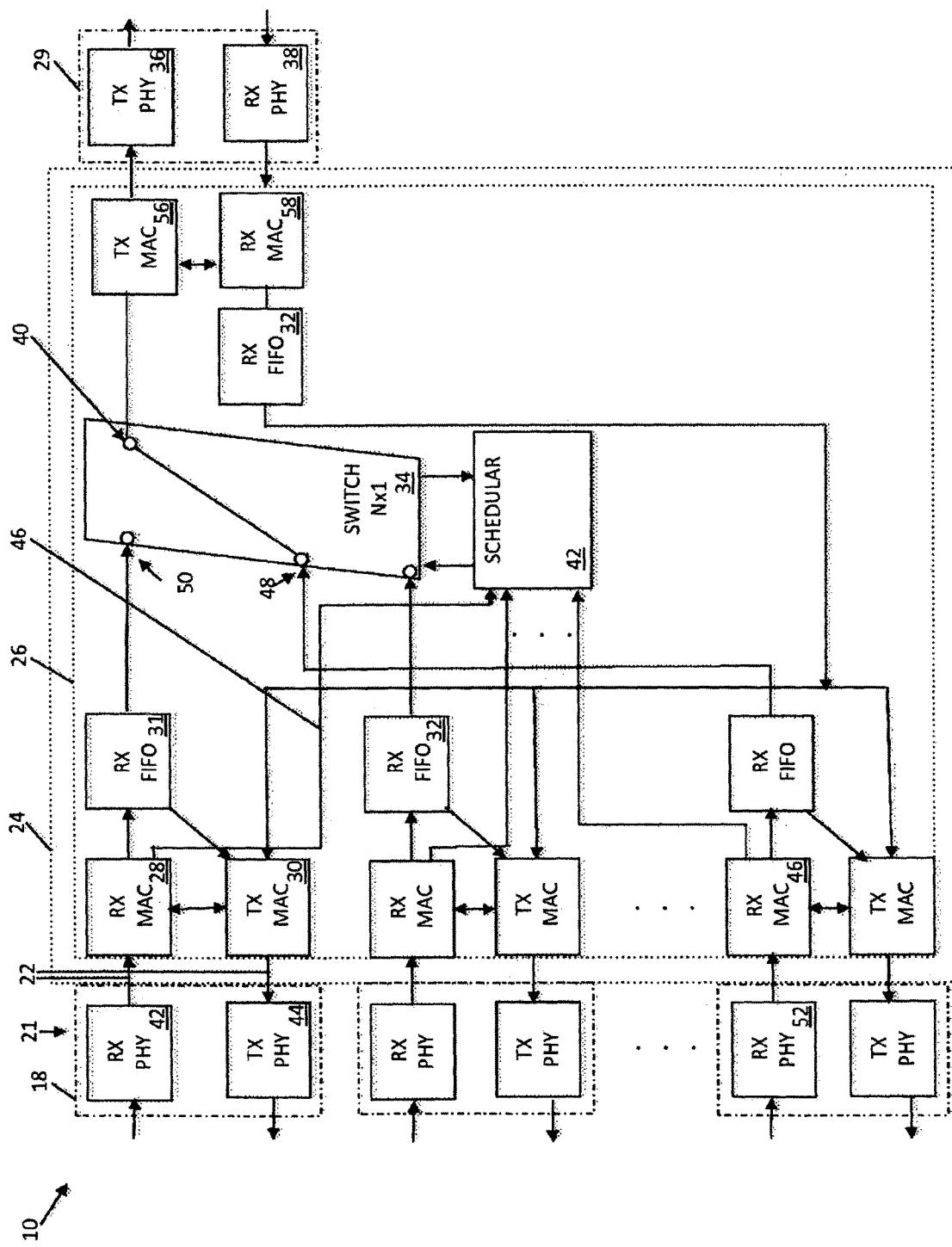
FIG. 2 shows a block diagram illustrating networking componentry of the device.

FIG. 2 shows a block diagram of the networking componentry 24 of the device 10. In this embodiment, the networking componentry comprises a plurality of modules integral with the field programmable array 26 or other logic device. The network componentry 24 is in communication with the plurality of transceivers 21 at the client ports via strip lines 22, for example. The networking componentry 24 is also in communication with the transceiver 29 of the service port 27.

In alternative embodiments, one or more of the modules shown as being integral with the field programmable field array 26 may in fact be not so integrated, or components not shown to be integral may in fact be wholly or partially integrated. For example, receive (Rx) Media Access Control (MAC) module 28 and the transmit (Tx) MAC module 30 may comprise dedicated hardware modules mounted to the printed circuit board 12. Some of the modules may be partially implemented on the FPGA, and partially on other components mounted on the circuit board. For example, the Rx and Tx MAC modules may have a preprocessing sub module off the FPGA 26 and a further processing sub module integral with the FPGA. In one embodiment the device 10 is connected to a communications cable that carries electrical Ethernet packets, and the electrical Ethernet packets may be communicated directly to a high speed input of the FPGA via a strip line, for example. In these embodiments, the transceivers and MAC modules may respectively comprise transceiver modules and MAC modules integral with the FPGA.

Figure 3:
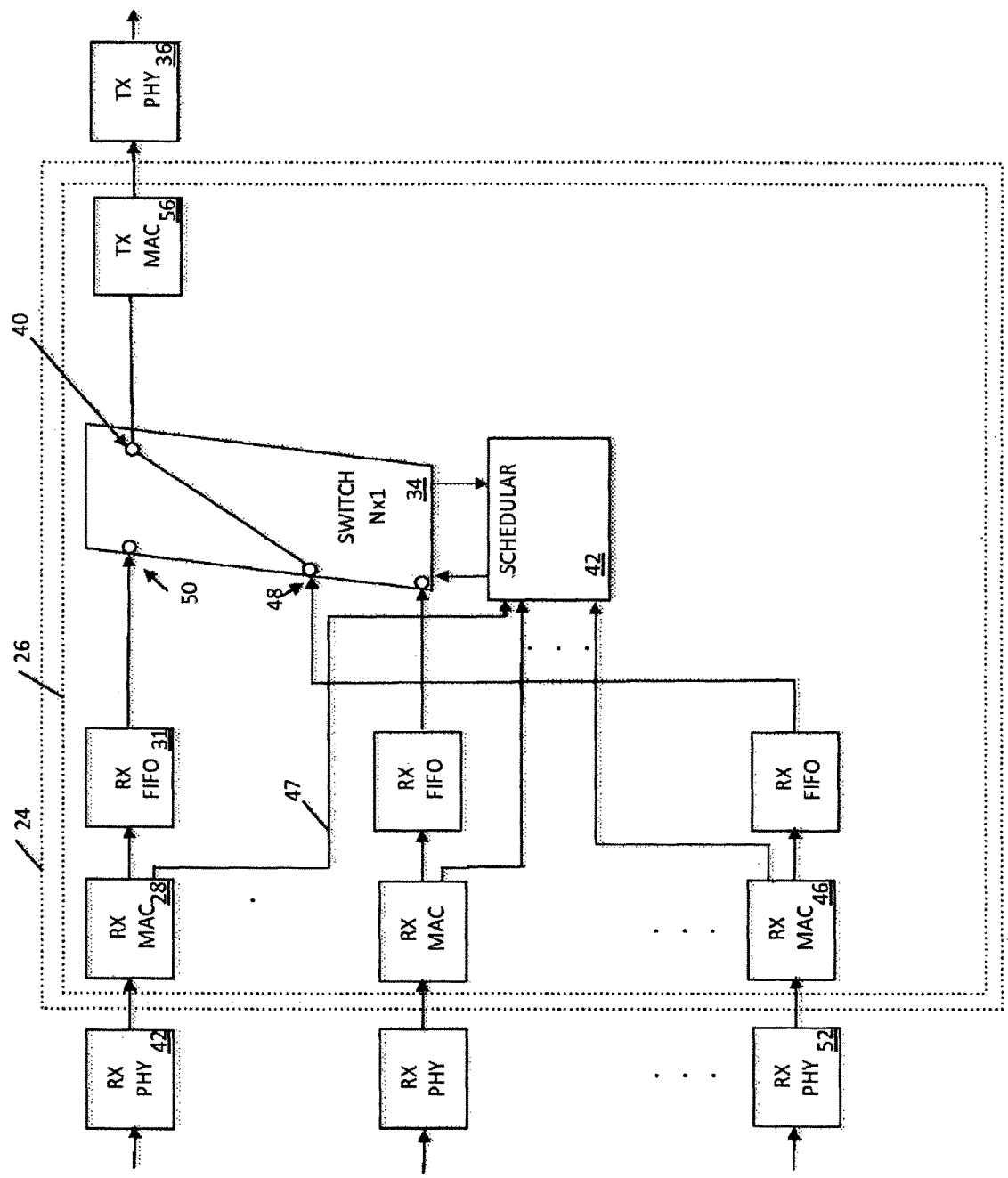
FIG. 3 shows a unidirectional network within the networking componentry.

FIG. 3 shows a unidirectional network within the networking componentry. Most other modules of the networking componentry, and their connections, that are not part of the unidirectional network are hidden for explanatory purposes only. The unidirectional network is arranged to communicate electromagnetic communications in the form of packets, for example Ethernet packets, received by any one of the transceivers at the plurality of client ports 21 to the transceiver 26 at the service port 27.

The unidirectional network also comprises a switch 34 in the form of a 1-pole multiway switch (Nx1 switch) that can be operated to electromagnetically connect any one of the client port receivers, such as Rx PHY 42 and 52, with the service port transmitter 36. The 1 pole, indicated by the numeral 40, is in electrical communication with the service port transceiver 29. The multiple ways, such as 48 and 50, (there are more than three ways in this embodiment) are each in communication with a respective one of the receivers of the client ports 21. In this embodiment, MAC modules, such as 28, are electromagnetically disposed between the switch and the client port transceiver.

The unidirectional network also comprises a plurality of buffers, such as buffers 31, in the form of first-in-first-out (FIFO) buffers. Buffer 31, for example, is electromagnetically disposed between one of the plurality of client port receivers 21 and the multiway switch 34. The Rx FIFO buffers combined may be regarded as a single buffer, in which case the buffer is electromagnetically disposed between the plurality of client port receivers and the multiway switch. In this embodiment, electromagnetic communications received on different ones of the plurality of client port receivers are buffered with different client port buffers. Each of the client port buffers are arranged, in this but not necessarily all embodiments, to exclusively cooperate with a respective one of the plurality of client port receivers. Embodiments in which a respective one of the client port buffers is dedicated to each of the plurality of client port receivers may have less latency than embodiments in which the plurality of client port receivers share a buffer.

The networking componentry 24 has a scheduler 42. The scheduler 42 determines the order in which the switch 34 connects with the plurality of client port receivers 21. The scheduler 42 and the client port Rx MAC modules, such as 28, are in communication via an electrical conductor in the form of strip lines 46. The client port Rx MAC modules are each arranged to signal to the scheduler the arrival of electromagnetic communications at their respective client ports. The signal may be, for example, a one clock cycle logical 1. The scheduler comprises logic gates, and memory implementing a first-in-first-out (FIFO) buffer. Port identification information is stored in the FIFO buffer in the order that signals are received from the client ports' Rx MACs. The scheduler executes a scheduling algorithm that is, in this embodiment, a first-in-first out algorithm. Thus the messages are forwarded to the service port in order of being received by the device 10. For example, if the scheduler 42 receives a signal from Rx MAC 46 then a signal from Rx MAC 28, then the scheduler will cause the switch 34 to connect way 48 to the 1 pole to receive packets from receiver 52 and then, after the packets from receiver 52 are received, connect way 50 to the 1 pole to receive packets from receiver 42. Generally any suitable, scheduling algorithm, such as a round robin algorithm, may be used. Electronic order applications, such as electronic trading, may prefer FIFO scheduling. In the case that signals received from two or more Rx MACs are temporally indistinguishable, the scheduler may execute another algorithm to determine which port has priority. For example, the algorithm may be a round robin algorithm or arbitrarily give one of the ports priority. Random port selection may also be used. The scheduler may also comprise packet collision handling.

Figure 4:
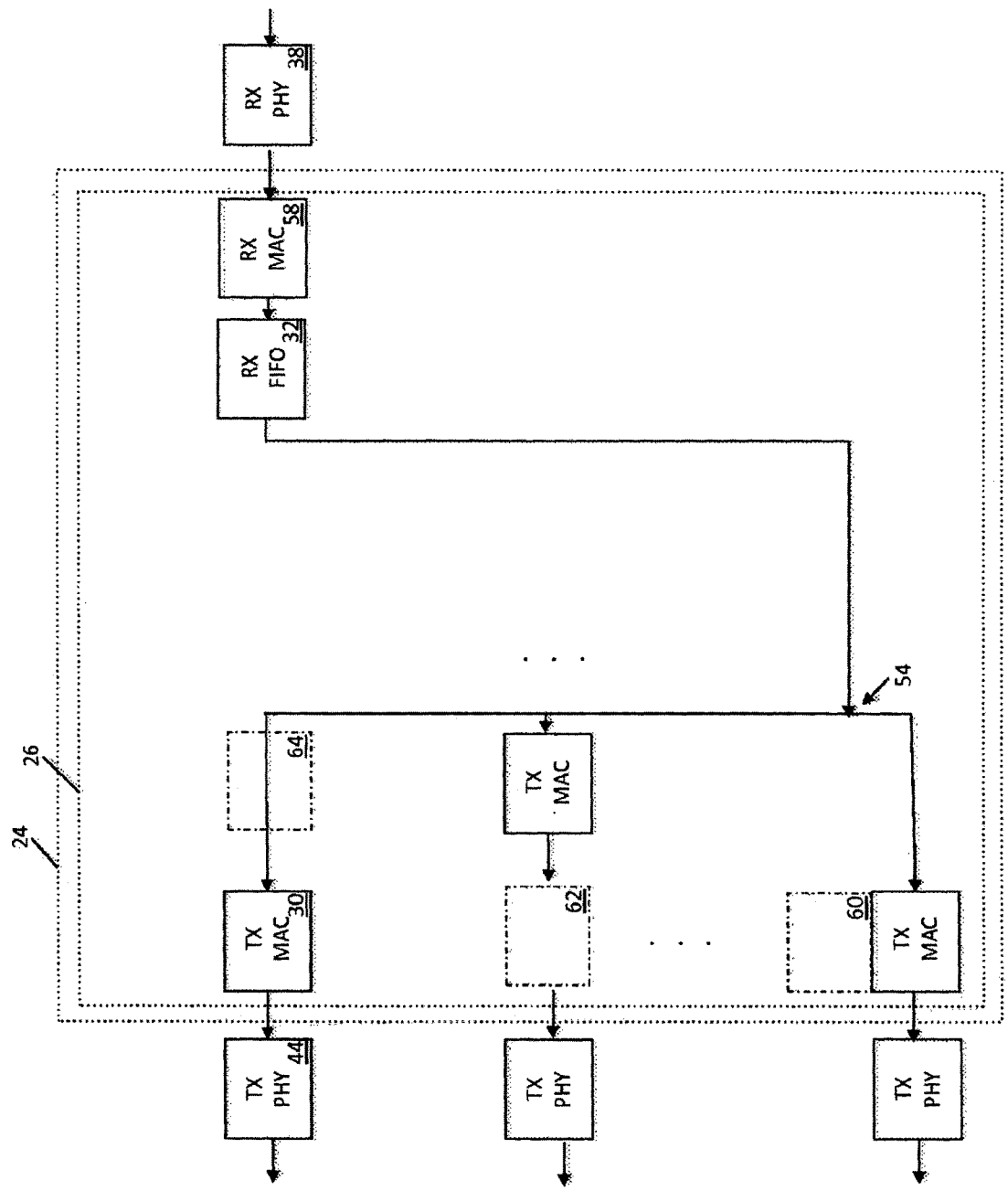
FIG. 4 shows another unidirectional network within the networking componentry.

FIG. 4 shows another unidirectional network within the networking componentry. Most other modules of the networking componentry, and their connections, that are not part of the other unidirectional network are hidden for explanatory purposes only. The other unidirectional network is arranged to communicate electromagnetic communications from the service port 29 to the plurality of client ports 21. The other unidirectional network comprises a common bus, generally indicated by the numeral 54. The common bus is electromagnetically disposed between the plurality of client ports 21 and the service port 29. The bus broadcasts any electromagnetic communications received by the server port receiver (Rx PHY) 38 towards the plurality of client ports.

Many circumstances require that a message intended for a particular client not reach any other client. This may be for confidentiality purposes, for example. In the case that the networking device 10 is used for electronic trading, for example, the prices and quantities associated with client orders must remain strictly confidential. The networking componentry 24 is arranged to associate filter information with each of the plurality of client ports 21 and is arranged to communicate an electromagnetic communication received by the service port 29 to those of the plurality of client ports 21 that have associated filter information indicated by the electromagnetic message. In this but not necessarily in all embodiment, the filtering is performed by client port transmit (Tx) MAC modules, for example that indicated by the numeral 30. The client port transmit MAC modules are electromagnetically disposed between a respective transmitter, for example transmitter 44, and the common bus 54. The Tx MACs each have an information comparator arranged to extract filter information from the electromagnetic message received via the service port receiver 38 and then compare the extracted filter information with filter information associated with the ports. The information may be extracted from at least one of a header, a payload and a trailer. If the extracted filter information matches filter information associated with a port then the Tx MAC communicates the communication to the transmitter the Tx MAC is in communication with. In this embodiment, but not necessarily in all embodiments, the filter information is stored in memory within the Tx MACs. The filter information comprises, in this embodiment, MAC address information. Some alternative embodiments have filters that filter on the basis of Internet protocol (IP) address information, or filters that operate on another Open Systems Interconnection (OSI) model layer, for example the network or transport layers. The filters may comprise of at least one of a MAC address filter, an IP filter, an IP port filter, a TCP port filter, and a UDP port filter, for example. IP address and port filtering is logically part of layer 3 and layer 4 packet processing respectively, above the layer that the MACs operate at (layer 2). The filters may comprise a header information filter, a payload information filter and a trailer information filter, for example.

The client port Tx MACs may incorporate any of these filters, or alternatively and/or additionally there may be additional electromagnetic communications filters, for example optional filter modules 60 to 64 of FIG. 4. IP address filtering may be implemented by additional IP filters that are in series the client port Rx MACs, for example. The additional filters may be electrically disposed between the common bus and the Tx MACs, as for optional filter 63, or the Tx MACs and the Tx PHYs, as for optional filter 62 for example. This may, however, add latency to the receive path. Another implementation with potentially lower latency has IP filters in parallel with the RX MACs, as for optional filter 60, where the IP address and port filters examine the incoming data at the same time as the MAC.

Each of the plurality of client port receivers may be electromagnetically isolated from a respective one of the plurality of client port transmitters. The embodiment of the networking device of FIGS. 1 to 4 is so arranged.

In this embodiment, the networking componentry associates filter information that uniquely identifies each of the plurality of client ports. Consequently, it is possible for the server to send a message which is received by only the intended client recipient. The networking componentry is also able, in this embodiment at least, to associate filter information with more than 1 client port. Consequently, the server may send a message for broadcasting or multicasting and the networking device will comply.

The filters may be automatically configured during initial communications between the plurality of clients and the device. The management unit may, however, be instructed via the serial, USB, Ethernet or other interfaces to configure the filters of the networking componentry discussed above. The management unit is in communication with the FPGA or ASIC via tracks 13 for communication of instructions and filter information.

In this embodiment of a networking device 10, but not necessarily all embodiments, the other unidirectional network has a first communication control system. Electromagnetic communications received by the service port receiver 38 and subsequently processed by the service port receive (Rx) MAC 58, may be stored in a service port buffer 32 in the form of a first-in-first-out buffer. Buffering may be required if a client port transmitter is not available because, for example, the respective connected client has sent a stop or pause transmission command to the networking device, or a buffer is reaching capacity. Without the communication control system the received electromagnetic communications may be partially or entirely discarded if the buffer is at capacity, for example, which may be unacceptable in many circumstances. Generally, the first communication control system may prevent information overload of the networking device and thus prevent information loss.

The service port Tx MAC 56 is in communication with the service port Rx FIFO 32. The Tx MAC 56 and the Rx FIFO 32 cooperate to control the flow of electromagnetic communications to the client port transmitters without information loss. In the case that the service port buffer 32 is at or approaching capacity, or an upper capacity threshold is reached, then the Rx FIFO 32 may instruct the Tx MAC 56 to cause the service port transmitter 36 to send a stop or pause transmission command to the server before information is lost because it can not be processed on receipt. The command may be for the server to pause transmission for between 1 µs and 100 µs.

The upper capacity threshold and buffer size may be chosen in view of the time taken for the command to reach its destination. Once the buffer has at least partially emptied or a lower capacity threshold reached, the Rx FIFO 32 may instruct the Tx MAC 56 to cause the service port transmitter 36 to send a start transmission command that is subsequently received by the connected server.

In this embodiment of a networking device, but not necessarily for all embodiments, the unidirectional network has a second communication control system. The client port 18, as may the other client ports 21, is in communication with a client port buffer 31 in the form of a first-in-first-out buffer. Electromagnetic communications received by the client port receiver 42 may be stored in the buffer 31 if the switch 34 does not connect respective way 50 with the 1-pole 40. When the switch is operated to connect the respective way 50 to the pole 40, information stored in the buffer 31 may be transmitted via the switch 34 to the client port Tx MAC 56 and then to the client port transmitter 36.

The buffer 31 is arranged to, when it is approaching and/or at capacity, to send to the corresponding Tx MAC 30 an instruction to cause the client port transmitter 44 to send a pause or stop transmission command to the client connected to the respective port. Without the second communication control system, the electromagnetic communications received by the client port transmitters may be partially or entirely discarded, which may be unacceptable in many circumstances. Generally, the second communication control system may prevent information overload of the networking device and subsequent information loss.

Similarly, a stop or pause command received by the client port receiver 42 from the connected client and communicated to the Rx MAC 28 will cause the Tx MAC 30 stop or pause transmission.

In the embodiment of FIGS. 1 to 4, the scheduler, the plurality of client port transmitters, the multiway switch, and the service port transmitter are synchronized by a clock signal from the reference clock 33. If electromagnetic signals within the network device traveled from a first network device component to another network device component having a different clock frequency than the other then a buffer would be required. The buffer would introduce latency. Consequently, this embodiment of a networking device may have relatively low latency.

While the network connections described above may comprise optical and/or electrical Ethernet (10 Mb, 40 Mb, 1 Gb, 10 Gb, 40 Gb, 100 Gb, 400 Gb, 1 Tb), it will be understood that other network types and protocols may be used, such as INFINIBAND and WiFi. Generally, any packet based protocol may be used. Alternatively or additionally, one or more of the network connections may alternatively be a serial port connection, a USB port connection, a Fire Wire™ port connection, a ThunderBolt™ port connection, a PCI or PCIe connection, a SONET (or SDH) connection with or without a sonnet demultiplexing device, or generally any suitable type of connection.

Generally, in the disclosure above, the term "electromagnetically" may be replaced with "electrically" when required for embodiments that are primarily electrical in nature. For example, a component within an ASIC or FPGA may be electrically disposed between two other components in the ASIC or FPGA.

Variations and/or modifications may be made to the embodiments described without departing from the spirit or ambit of the invention. For example, the networking componentry may comprises optics. The filter information may comprise optical wavelength information. For example, at least some of the electromagnetic filters may be optical bandpass filters comprising Bragg fiber gratings and/or dielectric stack filters. The multiway switch may comprise an optical switch, such as a microelectromechanical system (MEMS) optical switch or an optoelectronic switch. Alternatively, the network connections may be wireless. The networking device may modify the electromagnetic communication and other electromagnetic communication. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A network device comprising:
   a plurality of client ports arranged for communicating with a plurality of clients;
   a service port arranged for communicating with a machine; and
   physical network componentry comprising:
      a reference clock; and
      a logic device, comprising:
         a scheduler for selecting a client port of the plurality of client ports based on an order of a plurality of electromagnetic communications received by the plurality of client ports; and
         a multiway switch, configured by the scheduler to place the selected client port of the plurality of client ports in communication with the service port;
   wherein the multiway switch is interposed between the plurality of client ports and the service port;
   wherein electromagnetic communications received from the selected client port are communicated, after configuration by the scheduler, via the multiway switch to the machine,
   wherein the plurality of client ports, the multiway switch, the scheduler, and the service port are synchronized by a clock signal from the reference clock.

2. The network device of claim 1, wherein the networking componentry comprises a common bus.

3. The network device of 2, wherein the common bus is arranged to broadcast the plurality of electromagnetic communication from the service port to the plurality of client ports.

4. The network device of claim 2, further comprising a service port buffer that is electrically disposed between the service port and the common bus.

5. The network device of claim 1, further comprising a plurality of client port transmitters, each of the plurality of client ports having a respective one of the plurality of client port transmitters.

6. The network device of claim 1, further comprising a communication control system arranged to send via the service port a command to at least one of pause and stop transmission to the networking device to prevent information loss when the networking device is approaching capacity.

7. The network device of claim 1, wherein the logic device is a field programmable gate array (FPGA).

8. The network device of claim 1, wherein the networking componentry is arranged to associate filter information with each of the plurality of client ports, and arranged to communicate each of the plurality of electromagnetic communications received by the service port to those of the plurality of client ports that have associated filter information indicated by the electromagnetic communication.

9. The network device of claim 8, wherein the networking componentry is arranged to extract filter information from the plurality of electromagnetic communications.

10. The network device of claim 9, wherein the networking componentry is arranged to compare the extracted filter information with the filter information associated with the plurality of client ports.

11. The network device of claim 8, wherein each of the plurality of client ports may have associated filter information stored thereat.

12. The network device of claim 8, wherein the filter information comprises at least one of a MAC address, an Internet Protocol (IP) address, IP port identification information, Transmission Control Protocol (TCP) port identification information, and User Datagram Protocol (UDP) port identification information.

13. The network device of claim 8, wherein the networking componentry comprises a plurality of electromagnetic communication filters that each have associated filter information.

14. The network device of claim 13, wherein each of the plurality of client ports is operatively coupled to at least one of the plurality of electromagnetic communication filters.

15. The network device of claim 13, wherein each of the plurality of electromagnetic communication filters is at a respective one of the plurality of client ports.

16. The network device of claim 13, wherein the plurality of electromagnetic communication filters each comprise at least one of a Media Access Control (MAC) filter, an Internet protocol (IP) filter, an IP filter, a TCP filter, and a UDP port filter.

17. The network device of claim 8, wherein the networking componentry associates with each of the plurality of client ports filter information unique to each of the plurality of client ports.

18. The network device of claim 8, wherein the networking componentry associates the filter information with more than one of the plurality of client ports that is the same for each of the more than one of the plurality of client ports.

* * * * *

UNITED STATES PATENT AND TRADEMARK OFFICE
CERTIFICATE OF CORRECTION

PATENT NO. : 10,623,335 B2
APPLICATION NO. : 15/723879
DATED : April 14, 2020
INVENTOR(S) : David Charles Ambler Snowdon, Charles Nicholas Alexander Thomas and Scott McDaid It is certified that error appears in the above-identified patent and that said Letters Patent is hereby corrected as shown below:

In the Claims

Column 13, Line 33, in Claim 3, the phrase "The network device of 2" should read -- The network device of claim 2 --.

Signed and Sealed this
Thirtieth Day of June, 2020

Andrei Iancu
*Director of the United States Patent and Trademark Office*